United States Patent
Yamasaki et al.

(10) Patent No.: US 9,493,077 B2
(45) Date of Patent: Nov. 15, 2016

(54) HYBRID DRIVE SYSTEM

(71) Applicant: MITSUBISHI ELECTRIC CORPORATION, Chiyoda-ku, Tokyo (JP)

(72) Inventors: Hisanori Yamasaki, Tokyo (JP); Yasuhiko Wada, Tokyo (JP); Hidetoshi Kitanaka, Tokyo (JP); Keita Hatanaka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/786,816

(22) PCT Filed: Jul. 1, 2013

(86) PCT No.: PCT/JP2013/068060
§ 371 (c)(1),
(2) Date: Oct. 23, 2015

(87) PCT Pub. No.: WO2015/001605
PCT Pub. Date: Jan. 8, 2015

(65) Prior Publication Data
US 2016/0082849 A1    Mar. 24, 2016

(51) Int. Cl.
*B60L 11/18* (2006.01)
*B60L 1/00* (2006.01)
(Continued)

(52) U.S. Cl.
CPC .............. *B60L 11/1803* (2013.01); *B60L 1/00* (2013.01); *B60L 11/12* (2013.01); *B60L 11/18* (2013.01);
(Continued)

(58) Field of Classification Search
CPC .. B62D 55/24; B62D 55/244; B62D 55/253; B62D 55/26
See application file for complete search history.

(56) References Cited

U.S. PATENT DOCUMENTS 9,145,060 B2 *    9/2015    Hatanaka ................ B60L 1/003

FOREIGN PATENT DOCUMENTS

EP    2 127 935 A2    12/2009
JP    05-09143 U    2/1993
(Continued)

OTHER PUBLICATIONS

International Search Report (PCT/ISA/210) mailed on Sep. 3, 2013, by the Japanese Patent Office as the International Searching Authority for International Application No. PCT/JP2013/068060.
Written Opinion (PCT/ISA/237) mailed on Sep. 3, 2013, by the Japanese Patent Office as the International Searching Authority for International Application No. PCT/JP2013/068060.

*Primary Examiner* — John Walters
*Assistant Examiner* — James Triggs
(74) *Attorney, Agent, or Firm* — Buchanan Ingersoll & Rooney PC

(57) ABSTRACT

A hybrid drive system includes first and second power supply devices supplying direct-current power, first and second power storage devices respectively connected to the first and second power supply devices and accumulating or discharging direct-current power, a first load device receiving direct-current power from the first power supply device and the first power storage device and driving a first load, a second load device receiving direct-current power from the second power supply device and the second power storage device and driving a second load, a first diode including an anode side terminal connected to an output side of the first power storage device, a second diode including an anode side terminal connected to an output side of the second power storage device, and an auxiliary power supply device to which a connection terminal of cathode side terminals of the first and second diodes is connected as an input terminal.

20 Claims, 10 Drawing Sheets

(51) Int. Cl.
 *B60L 11/12* (2006.01)
 *B60W 10/26* (2006.01)
 *B60W 20/00* (2016.01)
 *H02J 7/00* (2006.01)
 *B61C 3/00* (2006.01)
 *B61C 5/00* (2006.01)
 *H02J 1/10* (2006.01)
 *H02J 7/34* (2006.01)

(52) U.S. Cl.
 CPC ........... *B60L 11/1805* (2013.01); *B60W 10/26* (2013.01); *B60W 20/00* (2013.01); *B61C 3/00* (2013.01); *B61C 5/00* (2013.01); *H02J 1/10* (2013.01); *H02J 7/00* (2013.01); *H02J 7/34* (2013.01); *Y02T 10/7005* (2013.01); *Y02T 10/7077* (2013.01); *Y10S 903/93* (2013.01)

(56) References Cited

FOREIGN PATENT DOCUMENTS

| | | |
|---|---|---|
| JP | 2004-336833 A | 11/2004 |
| JP | 2006-219128 | 8/2006 |
| JP | 2008-042989 A | 2/2008 |
| JP | 2008-141877 A | 6/2008 |
| JP | 2008-220084 A | 9/2008 |
| JP | 2004-336833 A | 10/2008 |
| JP | 2009-290958 A | 12/2009 |
| JP | 2011-142701 A | 7/2011 |
| WO | WO 2013/018167 A1 | 2/2013 |
| WO | WO 2013/021486 A1 | 2/2013 |

\* cited by examiner

HYBRID DRIVE SYSTEM

FIELD

The present invention relates to a hybrid drive system.

BACKGROUND

A conventional drive system for an induction motor for a railroad vehicle is disclosed, for example, in Patent Literature 1 below. It is mentioned in Patent Literature 1 that the drive system includes a plurality of sets of power supply sources that include power supply devices that generate direct-current power and power accumulating devices (power storage devices) that are connected in parallel to the outputs of the power supply devices to supply and accumulate direct-current power, the sets of power supply sources are connected, via open/close-controllable switches, to inverter devices that receive individual supplies of electric power via the direct-current output units, and, when the power supply source that is electrically set to an open state by the switch is connected to the power supply source on the connection partner side, the drive system monitors the direct-current output voltage of the power supply source in the open state and the direct-current output voltage of the power supply source on the connection partner side and connects the power supply source in the open state when the voltage difference between both the direct-current output voltages is equal to or lower than a predetermined differential voltage.

CITATION LIST

Patent Literature

Patent Literature 1: Japanese Patent No. 4166618

SUMMARY

Technical Problem

In the drive system for the railroad vehicle described in Patent Literature 1, it is normal for electric power from the power storage device to be used as electric power for services as well as for propulsion driving of the vehicle. In this case, the electric power from a plurality of sets (a plurality of groups) of power storage devices is supplied and consumed in common. Therefore, it is desirable to equalize the use of the electric power from the groups of power storage devices as much as possible.

However, when there is, for example, a temperature difference among the groups of power storage devices, the rate of use of the power storage device on the higher temperature side, where the internal resistance is smaller, increases. Therefore, there is a problem in that the rate of use increases on the higher temperature side and the temperature of the power storage device on the higher temperature side further rises. That is, in the conventional hybrid drive system, a problem has been recognized in that the service lives of the power storage devices cannot be equalized because of the variation in the rate of use among the power storage devices.

The present invention has been devised in view of the above and it is an object of the present invention to provide a hybrid drive system that can attain equalization of the service lives of power storage devices.

Solution to Problem

In order to solve the above problems and achieve the object, an aspect of the present invention is a hybrid drive system including first and second power supply devices that supply direct-current power, first and second power storage devices that are respectively connected to the first and second power supply devices and accumulate or discharge direct-current power, a first load device that receives direct-current power supplied from the first power supply device and the first power storage device and drives a first load, and a second load device that receives direct-current power supplied from the second power supply device and the second power storage device and drives a second load, the hybrid drive system including: a first diode that includes an anode side terminal connected to an output side of the first power storage device; a second diode that includes an anode side terminal connected to an output side of the second power storage device; and an auxiliary power supply device to which a connection terminal where cathode side terminals of the first and second diodes are connected is connected as an input terminal.

Advantageous Effects of Invention

According to the present invention, there is an effect where it is possible to attain equalization of the service lives of the power storage devices.

DESCRIPTION OF EMBODIMENTS

A hybrid drive system according to embodiments of the present invention is explained below with reference to the accompanying drawings. Note that the present invention is not limited to the embodiments explained below.

First Embodiment

Figure 1:
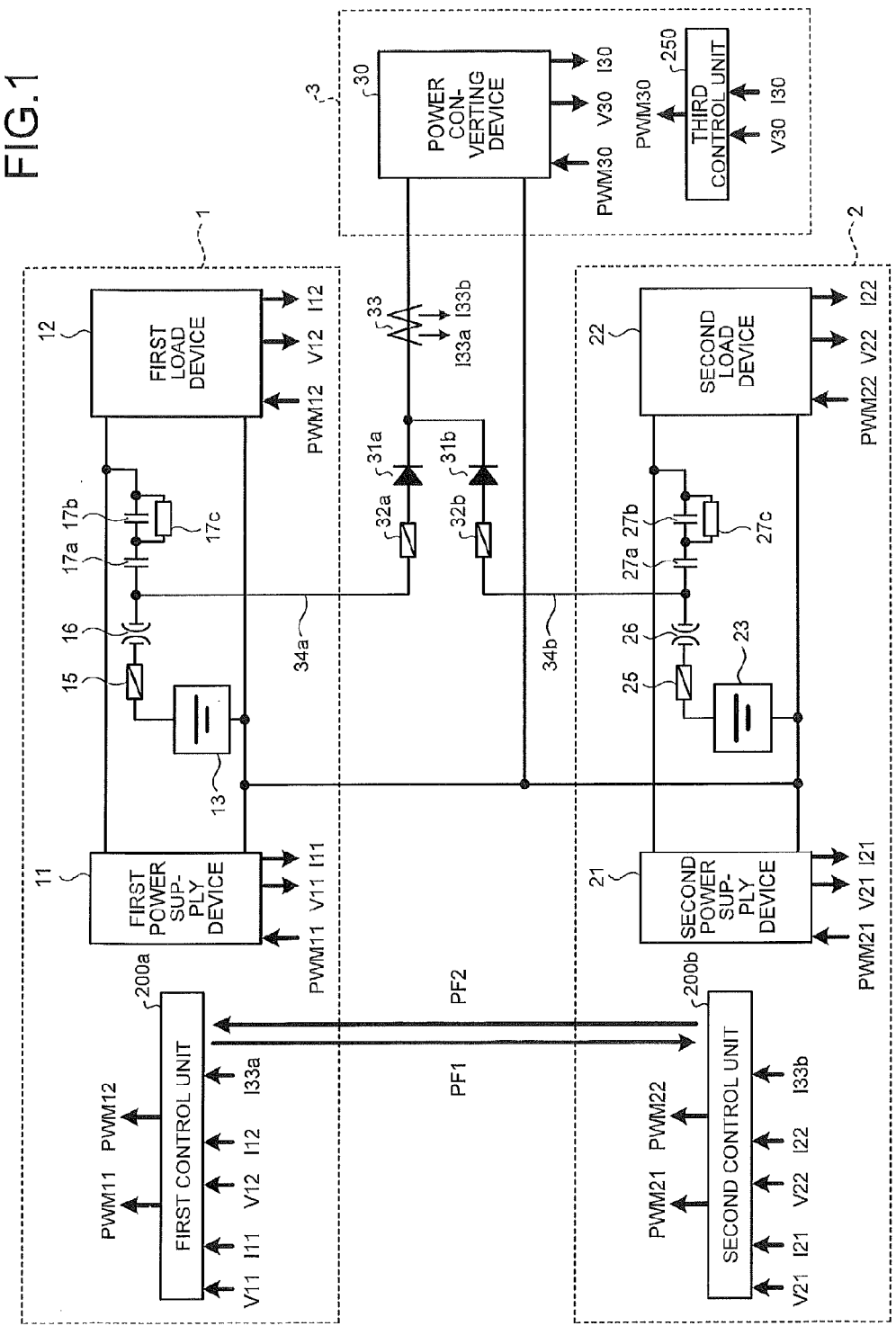
FIG. 1 is a diagram illustrating a configuration example of a hybrid drive system according to a first embodiment.

FIG. 1 is a diagram illustrating a configuration example of a hybrid drive system according to a first embodiment. The hybrid drive system according to the first embodiment includes, as illustrated in FIG. 1, a drive system 1 of a first group (hereinafter abbreviated as "drive system 1" as appropriate), a drive system 2 of a second group (hereinafter abbreviated as "drive system 2" as appropriate), and an auxiliary power supply device 3 that receives a power supply from the drive systems 1 and 2 in order to operate. The drive systems 1 and 2 are, for example, systems for propelling and driving a railroad vehicle. The auxiliary power supply device 3 is, for example, a device for supplying, to a load, electric power for services other than electric power for propulsion driving of the railroad vehicle.

The drive system 1 of the first group includes a first power supply device 11, a first load device 12, a first power storage device 13, and a first control unit 200a. The drive system 2 of the second group includes a second power supply device 21, a second load device 22, a second power storage device 23, and a second control unit 200b. The auxiliary power supply device 3 includes a power converting device 30 and a third control unit 250.

A breaker 16, a contactor 17a, which is a first contactor, a contactor 17b, which is a second contactor, a charging resistor 17c connected in parallel to the contactor 17b, and a fuse 15 functioning as an over-current protection element for the first power storage device 13 are provided between the first load device 12 and the first power storage device 13 as devices for the first power storage device.

Similarly, a breaker 26, a contactor 27a, which is a first contactor, a contactor 27b, which is a second contactor, a charging resistor 27c connected in parallel to the contactor 27b, and a fuse 25 functioning as an over-current protection element for the second power storage device 23 are provided between the second load device 22 and the second power storage device 23 as devices for the second power storage device.

Electric power is supplied to the auxiliary power supply device 3 from both the drive systems 1 and 2. Specifically, a power line 34a drawn out from the connection end where the breaker 16 and the contactor 17a of the drive system 1 are connected is connected to the power converting device 30 via a fuse 32a and a diode 31a, which is a first unidirectional element so that electric power from the first power supply device 11 or the first power storage device 13 is supplied to the power converting device 30, and a power line 34b drawn out from the connection end where the breaker 26 and the contactor 27a of the drive system 2 are connected is connected to the power converting device 30 via a fuse 32b and a diode 31b, which is a second unidirectional element, so that electric power from the second power supply device 21 or the second power storage device 23 is supplied to the power converting device 30. As illustrated in the figure, the cathode side terminal of the diode 31a and the cathode side terminal of the diode 31b face each other and are connected. Therefore, it is possible to prevent the electric power from the drive system 1 from flowing back to the drive system 2 side. Further, it is possible to prevent the electric power from the drive system 2 from flowing back to the drive system 1 side.

A current measuring device 33 for detecting the input current input to the auxiliary power supply device 3 is provided on the input side of the auxiliary power supply device 3. The current value (current measurement value) obtained by the current measuring device 33 is input to both the first and second control units (200a and 200b) as current values I33a and I33b.

The configurations of the first and second power supply devices (11 and 21) and the first and second load devices (12 and 22) are explained. For simplification of explanation, explanation will be made of the first power supply device 11 and the first load device 12 from which one of the two drive systems, i.e., the drive system of the first group, is configured.

Figure 2:
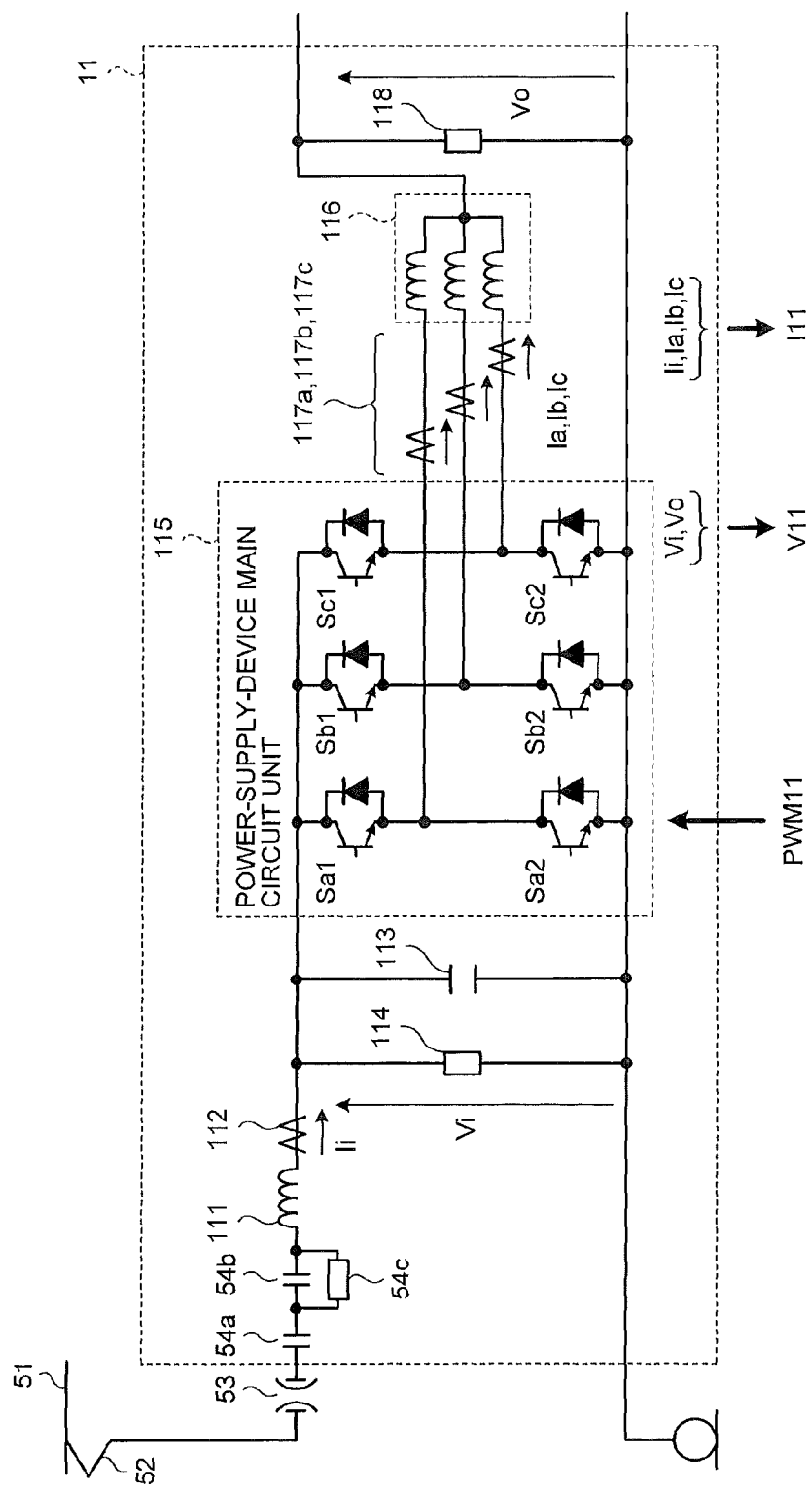
FIG. 2 is a diagram illustrating a configuration example of a first power supply device.

FIG. 2 is a diagram illustrating a configuration example of the first power supply device 11. The first power supply device 11 operates as a DC-DC converter that converts a voltage value of direct-current power supplied from a direct-current overhead wire 51 via a pantograph 52 into a direct-current voltage suitable for the first load device 12 and the first power storage device 13 connected to the output side. In FIG. 2, a step-down DC-DC converter that converts a voltage of input direct-current power into a lower voltage is illustrated as an example; however, the first power supply device 11 is not limited to this configuration.

As illustrated in FIG. 2, on the input side of the first power supply device 11, various components for freely transferring electric power, specifically, an overhead wire breaker 53, a contactor 54a, which is a first contactor for the first power supply device, a contactor 54b, which is a second contactor for the first power supply device, and a charging resistor 54c for the first power supply device connected in parallel to the contactor 54b are provided. Further, in the later stage section of the first power supply device 11, a filter reactor 111, which suppresses a rush current during an abnormal failure, an input-current measuring unit 112, which measures an input current (Ii), a filter capacitor 113, which accumulates direct-current power, an input-voltage measuring unit 114, which measures an input voltage (Vi), a power-supply-device main circuit unit 115, which performs a switching operation, an output reactor 116 for power conversion control, output-current measuring units 117 (117a, 117b, and 117c), which measure output currents (Ia, Ib, and Ic), and an output-voltage measuring unit 118, which measures an output voltage (Vo), are provided. Current information I11 (Ii, Ia, Ib, and Ic) measured by the input-current measuring unit 112 and the output-current measuring unit 117 and voltage information V11 (Vi and Vo) measured by the input-voltage measuring unit 114 and the output-voltage measuring unit 118 are input to the first control unit 200a. Although not illustrated in the figure, a similar measurement is performed in the second power supply device 21. Measured current information I21 (Ii, Ia, Ib, and Ic) and voltage information V21 (Vi and Vo) are input to the second control unit 200b.

The first control unit 200a performs arithmetic processing in accordance with the current information I11 (Ii, Ia, Ib, and Ic), the voltage information V11 (Vi and Vo), and the like, generates a PWM control signal (PWM11) for ON/OFF control of the semiconductor switches (Sa1, Sb1, Sc1, Sa2, Sb2, and Sc2) included in the power-supply-device main circuit unit 115, and controls the first power supply device 11. By being controlled in this way, the first power supply device 11 functions as a DC-DC converter. The second control unit 200b performs a similar control. The second control unit 200b executes arithmetic processing in accordance with the current information I21 (Ii, Ia, Ib, and Ic), the voltage information V21 (Vi and Vo), and the like, generates a PWM control signal (PWM21) for ON/OFF control of the semiconductor switches included in the power-supply-device main circuit unit, and controls the second power supply device 21. The third control unit 250 performs a similar control. The third control unit 250 executes arithmetic processing in accordance with current information I30, voltage information V30, and the like in a not-illustrated main circuit, generates a PWM control signal (PWM30) for ON/OFF control of not-illustrated semiconductor switches included in the main circuit, and controls the power converting device 30.

In FIG. 2, a three-phase multiplex form is illustrated as the power-supply-device main circuit unit 115 and the output reactor 116. This is because, if the power-supply-device main circuit unit 115 is configured in three phases, it is possible to appropriately shift switching timings of the phases of the power-supply-device main circuit unit 115. That is, the configuration in three phases is used for reducing the amplitude of current ripples of a three-phase combined output that is output from the first power supply device 11 and thereby reducing harmonics of the output current by shifting the occurrence timings of current ripples of the respective phases. Note that, as a form other than the three-phase form, for example, the power-supply-device main circuit unit 115 and the output reactor 116 can be configured in, for example, a single phase. Even in such a case, the function of the DC-DC converter is not lost.

Figure 3:
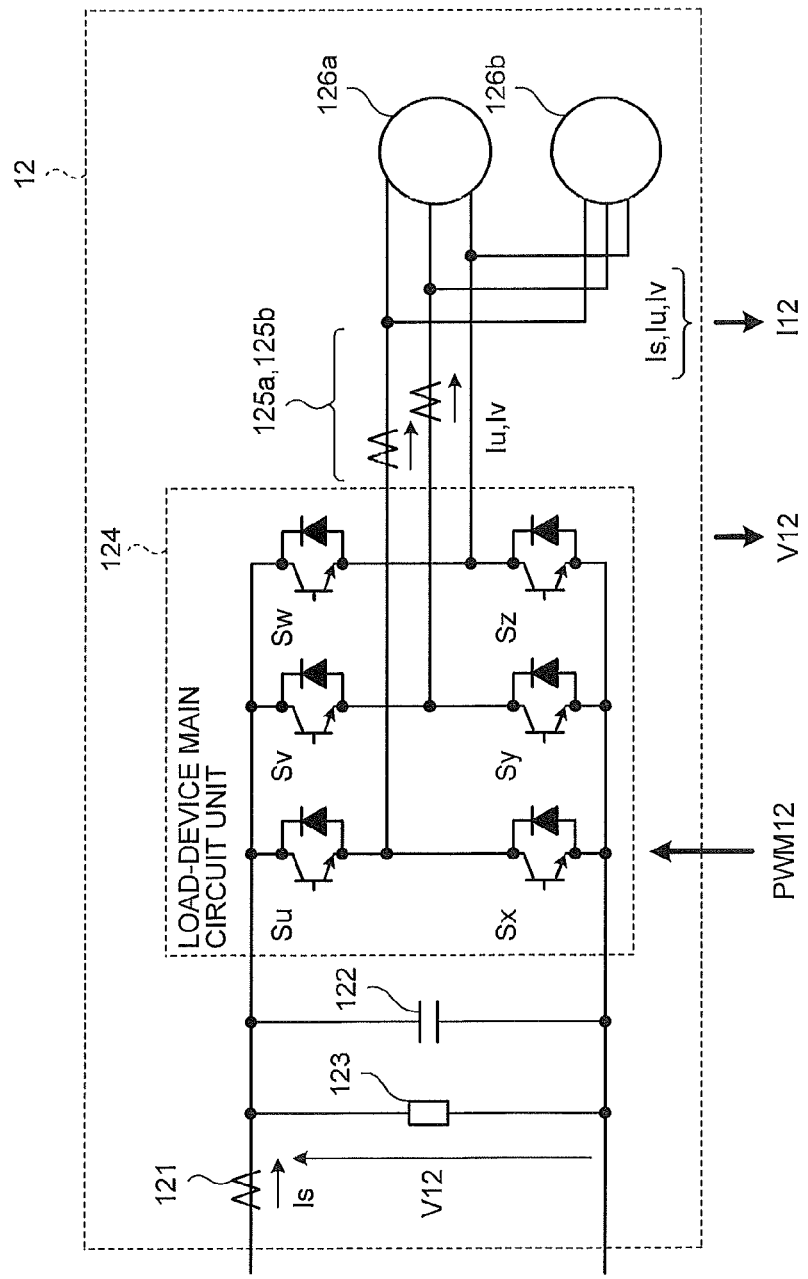
FIG. 3 is a diagram illustrating a configuration example of a first load device.

The configuration of the first load device 12 is explained. FIG. 3 is a diagram illustrating a configuration example of the first load device 12 and illustrates a configuration example for converting a voltage of input direct-current power into a voltage of alternating-current power and obtaining a driving force for propelling a vehicle.

As illustrated in FIG. 3, the first load device 12 includes a load-input-current measuring unit 121, which measures an input current (Is), a filter capacitor 122, which suppresses pulsation of the direct-current input voltage, a load-input-voltage measuring unit 123, which measures the input load voltage, a load-device main circuit unit 124, which is a semiconductor switch circuit for what is called an inverter operation for converting a direct-current voltage into an alternating-current voltage, load-output-current measuring units 125 (125a and 125b), which measure the output current of the load-device main circuit unit 124, and alternating-current motors 126a and 126b, which obtain the driving force by using the alternating-current power supplied from the load-device main circuit unit 124. Current information I12 (Is, Iu, and Iv) measured by the load-input-current measuring unit 121 and the load-output-current measuring units 125 and voltage information V12 measured by the load-input-voltage measuring unit 123 are input to the first control unit 200a. Although not illustrated in the figure, a similar measurement is performed in the second load device 22. Measured current information I22 (Is, Iu, and Iv) and voltage information V22 are input to the second control unit 200b.

The first control unit 200a performs arithmetic processing in accordance with the current information I12 (Is, Iu, and Iv), the voltage information V12, and the like and performs processing for generating a PWM control signal (PWM12) for ON/OFF control of the semiconductor switches (Su, Sv, Sw, Sx, Sy, and Sz) included in the load-device main circuit unit 124. By being controlled in this way, the load-device main circuit unit 124 functions as what is called an inverter.

Functions, operations, and the like of the switching devices such as the breakers and the contactors are explained using the drive system 1. Note that, because the operation of the drive system 2 is similar to the operation of the drive system 1, explanation of the operation of the drive system 2 is omitted.

The contactor 54a (see FIG. 2) is closed when the power supply device 11 is operating. The contactor 54a is opened, for example, when the power supply device 11 is not operating or when some abnormality occurs in the power supply device 11 and the operation of the power supply device 11 is immediately stopped. That is, the contactor 54a is a contactor for controlling the connection and disconnection of the power supply device 11 and the direct-current overhead wire 51.

When the operation of the power supply device 11 is started, it is necessary to charge the filter capacitor 113 (see FIG. 2) in the power supply device 11 quickly such that an over-current is not generated on the input side. Therefore, the charging resistor 54c is provided so that the filter capacitor 113 is charged while keeping a proper charging current value, and, when the charging is completed, the contactor 54b is closed to short-circuit both ends of the charging resistor 54c. During the normal operation after that, the contactor 54b is kept closed so that electric power is not consumed in the charging resistor 54c.

The fuse 15 (see FIG. 1) is provided to prevent a situation in which an abnormality occurs in the breaker 16, the load-device main circuit unit 124, or the like and an over-current continuously flows. The breaker 16 alone is a high-speed breaker that is similar to the overhead wire breaker 53. However, the breaker 16 is provided to mainly prevent an over-current due to the first power storage device 13. The contactor 17a, the contactor 17b, and the charging resistor 17c alone have functions similar to the functions of the contactor 54a, the contactor 54b, and the charging resistor 54c, respectively. However, the contactor 17a is a contactor for connecting or disconnecting the first power storage device 13 and the first load device 12. The charging resistor 17c is a charging resistor for limiting the charging current to an appropriate charging current to charge the filter capacitor 122 (see FIG. 3) provided at the input of the first load device 12. The contactor 17b is a contactor for short-circuiting the charging resistor 17c after completion of the charging of the filter capacitor 122 and preventing an input loss from occurring when the first load device 12 is driving. With the breakers, the contactors, and the like for the load device, the first power storage device 13 is safely connected to the first load device 12 or the first power supply device 11 and, on the other hand, it is possible to quickly disconnect the first power storage device 13, for example, when the first power storage device 13 is not in use or when an abnormality occurs in the first power storage device 13.

When outputting a control signal to the load-device main circuit unit 124 to control driving of the alternating-current motors 126a and 126b, the first control unit 200a controls the power-supply-device main circuit unit 115 such that the first power supply device 11 is subjected to power conversion control that matches the driving control performed on the alternating-current motors 126a and 126b, and performs charging and discharging control on the first power storage device 13.

When an abnormality occurs in the first power supply device 11, the first load device 12, or the like, in order to protect the devices, the first control unit 200a controls the opening of the contactors (54a, 54b, 17a, and 17b) and the breaker (16). When the devices are started, the first control unit 200a controls the turn-on of the contactors (54a, 54b, 17a, and 17b) and the breaker (16). To avoid complication, in FIG. 1, the illustration of control signals input to the breaker (16) and the contactors (54a, 54b, 17a, and 17b) is omitted.

In FIG. 1, signals PF1 and PF2, which are transferred between the first and second control units (200a and 200b), are signals for recognizing a failure of the first group or the second group, i.e., a failure between the systems. The signals are hereinafter referred to as "failure recognition signals".

With the above configuration, the control functions, and the like explained above, it is possible to perform hybrid driving that supplies electric power from both the first and second power supply devices (11 and 21) and the first and second power storage devices (13 and 23) to the first and second load devices (12 and 22).

Explanation will be made of a control operation for supplying the required electric power from both the drive systems (1 and 2) of the first group and the second group to the auxiliary power supply device 3.

For example, the same output command is given to the first and second load devices (12 and 22) configured from combinations of inverters and motors, and the first and second power storage devices (13 and 23) are configured from storage batteries having the same capacity. Therefore, basically, the states of charge (SOCs) and voltages in the first and second power storage devices (13 and 23) transition in the same manner. On the other hand, if there is a variation between the first and second power storage devices (13 and 23) due to the temperature condition and aged deterioration, differences appear in the charging amount and the charging voltage between the first and second power storage devices (13 and 23). If there are such differences, the drive systems fall into a situation in which, when the voltages of the power storage devices approach the upper limit or the lower limit, for example, the necessity for stopping the load devices or suppressing the outputs of the load devices occurs, the operations of the load devices are not aligned between the drive systems, and the rates of use of the power storage devices cannot be equalized.

Therefore, the hybrid drive system according to the first embodiment adopts a form in which, as explained above, electric power from the first and second power storage devices (13 and 23) is supplied, via the diodes 31a and 31b provided with the output ends (the cathode side terminals) thereof facing each other, to the auxiliary power supply device 3 provided in the vehicle formation together with the drive systems 1 and 2. With this form, electric power is supplied to the auxiliary power supply device 3 from the power storage device having the larger potential and the larger charging amount of the first and second power storage devices (13 and 23). Therefore, an effect is obtained where it is possible to attain equalization of the charging amounts or voltages (hereinafter generally referred to as "equalization of the voltages and the like") of the first and second power storage devices (13 and 23).

Equalization of the voltages and the like of the power storage devices can be realized by not only the connection configuration in which the diodes face each other but also a control method for the first and second power supply devices (11 and 21). The control method is explained below with reference to FIG. 1 and FIG. 4.

Figure 4:
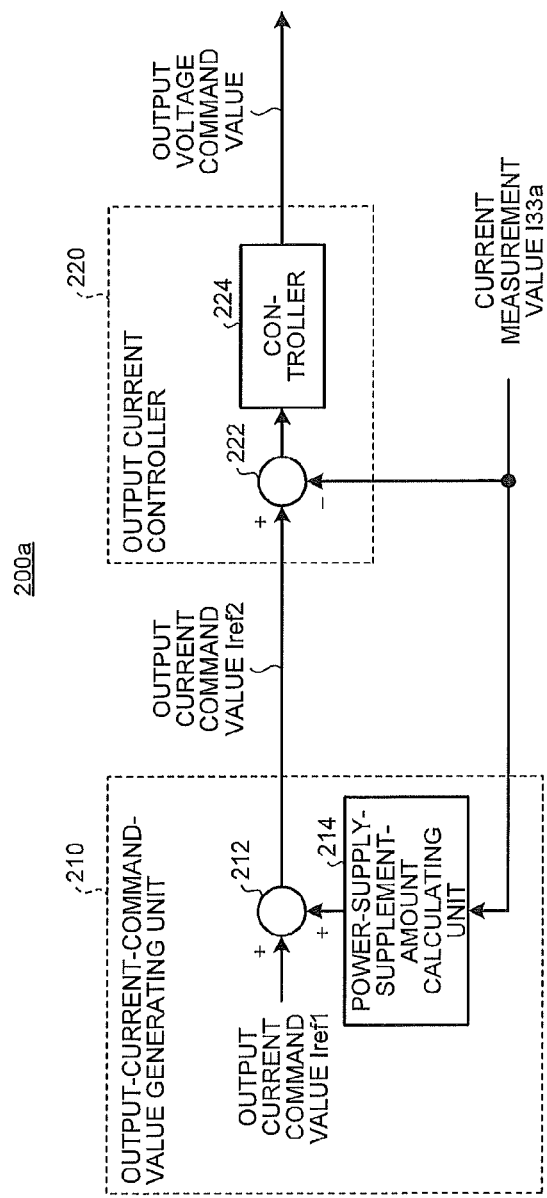
FIG. 4 is a diagram illustrating a configuration example of a first control unit that realizes equalization of the voltages and the like of power storage devices.

FIG. 4 is a diagram illustrating a configuration example of the first control unit 200a, which realizes equalization of the voltages and the like of the power storage devices. The second control unit 200b is configured in a similar manner. In the first control unit 200a, an output-current-command-value generating unit 210, which includes an adder 212 and a power-supply-supplement-amount calculating unit 214, and an output current controller 220, which includes a subtractor 222 and a controller 224, are provided.

The power-supply-supplement-amount calculating unit 214 outputs, for example, a half (or a component equivalent to a half) of the current measurement value I33a to the adder 212 as a power supply supplement amount. The adder 212 adds the power supply supplement amount to an output current command value Iref1 (referred to as a "first output current command value" when the sign is omitted). The adder 212 then inputs the addition value of the output current command value Iref1 and the power supply supplement amount to the output current controller 220 as an output current command value Iref2 (referred to as a "second output current command value" when the sign is omitted).

In the output current controller 220, the subtractor 222 performs subtraction of the output current command value Iref2 and the current measurement value I33a and inputs the difference value between the output current command value Iref2 and the current measurement value I33a to the controller 224, which is, for example, a PI controller, and the controller 224 generates an output voltage command value. The PWM control signal PWM11 is generated according to the output voltage command value.

In accordance with the control explained above, there is an equal distribution of electric power (first surplus power) obtained by subtracting the electric power required by the first load device 12 from the electric power generated in the drive system 1 of the first group and electric power (second surplus power) obtained by subtracting the electric power required by the second load device 22 from the electric power generated in the drive system 2 of the second group. That is, the power amount consumed by the auxiliary power supply device 3 is equally distributed (supplemented) between the first and second power supply devices (11 and 21). Therefore, it is possible to realize equalization of the voltages and the like of the first and second power storage devices (13 and 23).

When an abnormality occurs in any one of the drive systems and the operation is stopped for protection of the system, only the remaining drive system that is normally functioning needs to bear the required power of the auxiliary power supply device 3. In this case, control is performed using the failure recognition signals PF1 and PF2 described above. Specifically, the first and second control units (200a and 200b) transfer the failure recognition signals PF1 and PF2 in advance. When recognizing a failure or a stop of the system of the other group with the failure recognition signals PF1 and PF2, the first and second control units (200a and 200b) only have to output the current measurement value I33a itself (or an equivalent component), i.e., a component twice as much as the component when both the drive systems are normally functioning to the adder 212, as a power supply supplement amount without setting a half (a component equivalent to a half) of the current measurement value I33a as the power supply supplement amount as explained above.

Figure 5:
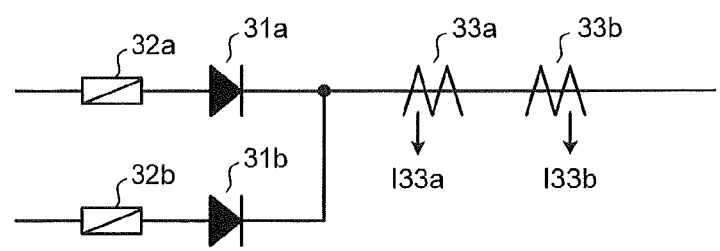
FIG. 5 is a diagram illustrating a configuration example in which current measuring devices are used exclusively for first and second control units.

In FIG. 1, the current measuring device 33 common to both the first and second control units (200a and 200b) is used as the current measuring device for measuring an input current input to the auxiliary power supply device 3. However, as illustrated in FIG. 5, current measuring devices 33a and 33b can be respectively provided exclusively for the first and second control units (200a and 200b) and the measurement values of the current measuring devices 33a and 33b can be respectively output to the first and second control units (200a and 200b). With this configuration, an effect is obtained where it is possible to parallelize the main hardware of the drive systems (1 and 2) of the first group and the second group including the first and second control units (200a and 200b) and it is possible to ensure redundancy of the systems.

Figure 6:
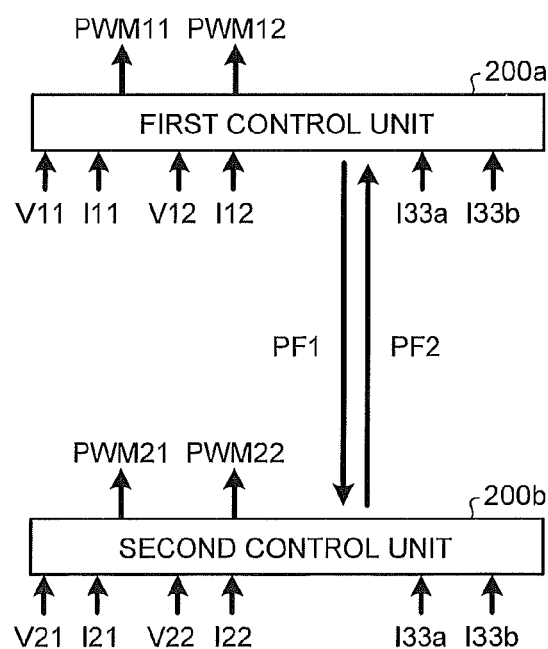
FIG. 6 is a diagram illustrating a configuration example in which both outputs of two current measuring devices are input to each of the first and second control units.

If the exclusive current measuring devices 33a and 33b are provided as illustrated in FIG. 5 and then the outputs of the current measuring devices 33a and 33b are input to both the first and second control units (200a and 200b) as illustrated in FIG. 6, it is possible to continue operations even if a failure occurs in any one of the current measuring devices. Therefore, it is possible to further ensure redundancy.

For example, each of the first and second control units (200a and 200b) always compares the measurement current values of the current measuring devices 33a and 33b. When the absolute value of the difference between the current values is equal to or smaller than a threshold set in advance, the first and second control units (200a and 200b) determine that both the current measuring devices 33a and 33b are normal. At this point, each of the control units only has to use a half (or a component equivalent to a half) of any one of the current measuring devices 33a and 33b (e.g., the current measuring device 33a) or the average of the measurement values of both the current measuring devices 33a and 33b.

When the absolute value of the difference between the measurement current values exceeds the threshold set in advance, the first and second control units (200a and 200b) determine that any one of the current measuring devices 33a and 33b has failed and discard, for example, the current measurement value of the current measuring device on the side outside the range of the normal input current of the auxiliary power supply device 3. The control units only have to use, as a common signal, a half of the output signal of the current measuring device that is normally functioning.

As explained above, the hybrid drive system in the first embodiment includes the first and second power supply devices that supply direct-current power, the first and second power storage devices that are respectively connected to the first and second power supply devices and accumulate or discharge direct-current power, the first load device that receives direct-current power supplied from the first power supply device and the first power storage device and drives the first load, and the second load device that receives direct-current power supplied from the second power supply device and the second power storage device and drives the second load. The hybrid drive system includes the first diode that includes the anode side terminal connected to the output side of the first power storage device, the second diode that includes the anode side terminal connected to the output side of the second power storage device, and the auxiliary power supply device to which the connection terminal where the cathode side terminals of the first and second diodes are connected is connected as an input terminal. Therefore, an effect is obtained where it is possible to equalize the charging amounts or voltages of the power storage devices and, as a result, it is possible to attain equalization of the service lives of the power storage devices.

With the hybrid drive system in the first embodiment, the first and second power supply supplement amounts, which are the same amount, are calculated on the basis of the current value obtained by the current measuring device that detects the input current input to the auxiliary power supply device. The first and second power supply supplement amounts are given as the command values for the first and second power storage devices, respectively. Therefore, an effect is obtained where it is possible to further facilitate equalization of the charging amounts or voltages of the first and second power storage devices.

The hybrid drive system in the first embodiment applies, when any one of the first and second power supply devices stops operating, to the other power supply device that continues a normal operation, the control for outputting the power supply supplement amount twice as large as the power supply supplement amount when both the power supply devices are normally functioning, i.e., the control for causing the power supply device that is normally functioning to take over electric power scheduled to be output by the power supply device that stops operating. Therefore, an effect is obtained where, even when a system failure occurs, it is possible to perform control for equalizing the charging amounts or voltages of the first and second power storage devices.

It is preferable that the hybrid drive system includes two current measuring devices that input measurement values to both the first and second control units. With this configuration, it is possible to obtain an effect where, even when any one of the current measuring devices has failed, it is possible to continue the operation control for attaining equalization of the charging amounts or voltages of the first and second power storage devices, an effect where it is possible to have redundancy in the system configuration, and an effect where, even when there is an error, such as offset, between the current measuring devices, it is possible to calculate a power supply supplement amount with the effect of the error reduced.

Second Embodiment

Figure 7:
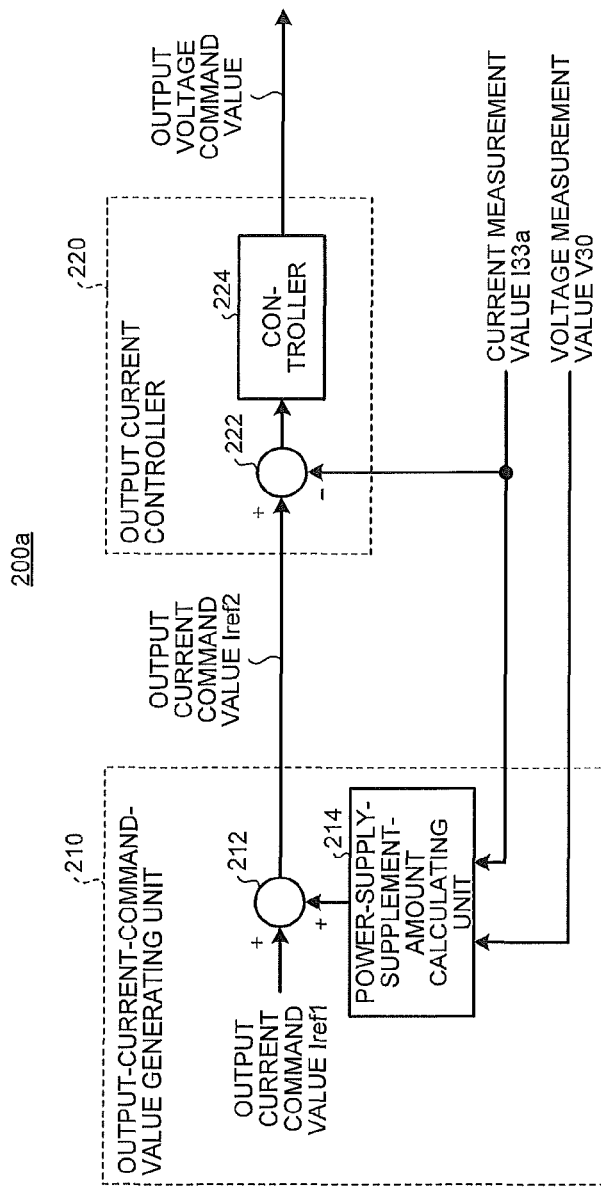
FIG. 7 is a diagram illustrating the configuration of the first control unit different from that illustrated in FIG. 4 as a configuration example of a hybrid drive system according to a second embodiment.

FIG. 7 is a diagram illustrating the configuration of the first control unit 200a different from that illustrated in FIG. 4 as a configuration example of a hybrid drive system according to a second embodiment. In the configuration illustrated in FIG. 4, only the current measurement value I33a is input to the power-supply-supplement-amount calculating unit 214. However, in the second embodiment illustrated in FIG. 7, both the current measurement value I33a and a voltage measurement value V30 are input to the power-supply-supplement-amount calculating unit 214.

In the configuration illustrated in FIG. 4, when the value of the voltage measurement value V30 is stable and substantially fixed, the configuration illustrated in FIG. 4 and the configuration illustrated in FIG. 7 can be regarded as equivalent. However, when fluctuations in the input voltage input to the auxiliary power supply device 3 cannot be ignored depending on the load connected to the auxiliary power supply device 3, using information concerning the voltage measurement value V30 as illustrated in FIG. 7 has significance.

In the case of the configuration illustrated in FIG. 7, the power-supply-supplement-amount calculating unit 214 calculates, on the basis of the current measurement value I33a and the voltage measurement value V30, an input power value supplied to the auxiliary power supply device 3 and outputs a half of the calculated input power value to the adder 212 as a power supply supplement amount. Note that processing after that is the same as the processing in the first embodiment; therefore, redundant explanation is omitted.

According to the control explained above, as in the first embodiment, there is an equal distribution of first surplus power obtained by subtracting the electric power required by the first load device 12 from the electric power generated in the drive system 1 of the first group and second surplus power obtained by subtracting the electric power required by the second load device 22 from the electric power generated in the drive system 2 of the second group. Thus, it is possible to realize equalization of the voltages and the like of the first and second power storage devices (13 and 23). Therefore, it is possible to attain equalization of the service lives of the power storage devices.

As explained above, with the hybrid drive system in the second embodiment, the first and second power supply supplement amounts, which are the same amount, are calculated on the basis of a product of the current value obtained by the current measuring device that detects the input current input to the auxiliary power supply device and the voltage value obtained by the voltage detector that detects the input voltage input to the auxiliary power supply device. The first and second power supply supplement amounts are given as command values for the first and second power storage devices, respectively. Therefore, an effect is obtained where it is possible to further facilitate equalization of the charging amounts or voltages of the first and second power storage devices.

Third Embodiment

With a hybrid drive system according to a third embodiment, explanation will be made of a control method that takes into account the temperature difference between the first and second power storage devices (13 and 23).

In the first and second embodiments, the control operation in the first and second control units (200a and 200b) that individually control the drive systems (1 and 2) of the first group and the second group to attain equalization of the voltages and the like of the power storage devices is mainly explained. However, if equalization of the rates of use of the power storage devices is further taken into account, a more preferable embodiment is obtained. In the third embodiment, the control operation of the first and second control units (200a and 200b) performed when equalization of the rates of use of the power storage devices is further taken into account is explained below.

To attain equalization of the rates of use of the power storage devices, it is necessary to take into account the temperature state of the power storage devices. When a railroad vehicle is explained as an example, the first and second power storage devices (13 and 23) respectively provided in the drive systems (1 and 2) of the first group and the second group may be provided in a vehicle interior or may be disposed on the roof or under the floor. In the case of such a disposition example, a situation in which the temperatures of the battery cells in the first and second power storage devices (13 and 23) are not equal could occur because of the operation states of other devices adjacent to the first and second power storage devices (13 and 23), the magnitude of a heat discharge amount during operation, the magnitude of the wind velocity and volume around a device during traveling, and the like.

As an internal resistance characteristic that depends on a chemical characteristic of the battery cells, in particular, in the case of a lithium ion battery, the lower temperature side often has a characteristic in that the resistance value is larger and it is difficult to charge and discharge an electric current. The first and second power supply devices (11 and 21), to which the first and second power storage devices (13 and 23) are respectively connected, can basically control electric currents themselves of the first and second power storage devices (13 and 23). However, when the internal resistance of the battery cells is large, the voltage drop is naturally also large. In such a situation, conflict with limitations such as a voltage upper limit and a voltage lower limit, with which an applied voltage to the battery cells should comply, easily occurs. Thus, it becomes necessary to narrow the charging and discharging current command value and thus the actual charging and discharging are suppressed. Therefore, when there is a temperature difference between the first and second power storage devices (13 and 23), the charging and discharging amount and the rate of operation of the device on the lower temperature side decrease.

Figure 8:
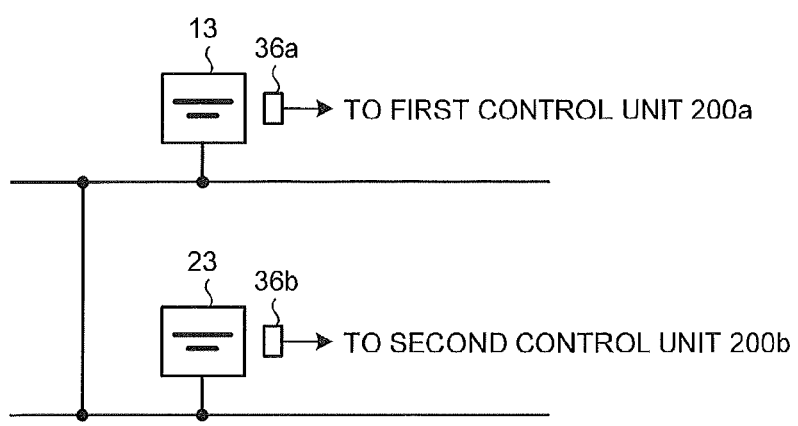
FIG. 8 is a diagram illustrating, as a configuration of a hybrid drive system according to a third embodiment, a configuration in which a temperature detection sensor that measures a representative temperature of battery cells is provided in each of first and second power storage devices.

Therefore, in the third embodiment, as illustrated in FIG. 8, temperature detection sensors 36a and 36b, which measure representative temperatures of the battery cells, are respectively provided in the first and second power storage devices (13 and 23). Both pieces of temperature information obtained by the temperature detection sensors 36a and 36b are respectively given to the first and second control units 200a and 200b. A control sequence (hereinafter referred to as a "temperature difference reduction mode") is set in the first and second control units (200a and 200b) for determining, for example, the presence or absence of a temperature difference and which of the power storage devices has a higher temperature and for controlling an SOC (an abbreviation of State of Charge; an index representing a charging state) of the power storage device having a lower temperature such that it becomes higher than the SOC of the device having a higher temperature.

Consequently, it is possible to charge more electric charge in the power storage device on the lower temperature side. Thus, even if the voltage drop on the lower temperature side is large, low voltage protection during discharging is less easily applied. Therefore, it is possible to improve continuity of the operation of the device. During charging, overvoltage protection and narrowing of the charging current command occur in the power storage device on the lower temperature side and the power supply device on the lower temperature side. However, by being controlled in this way, the charging time is extended; therefore, it is easy for the temperature to rise. Therefore, it is possible to reduce the temperature difference between the power storage devices.

When the "temperature difference reduction mode" as explained above is used, for example, if the absolute value of the difference of the representative temperature (hereinafter simply referred to as a "temperature difference") $\Delta T$ between the battery cells of the power storage devices 13 and 23 is equal to or larger than a setting value T1 [K] ($|\Delta T| \geq T1$), the power storage devices 13 and 23 are shifted to the "temperature difference reduction mode", and if, for example, $|\Delta T| \leq T2$ [K] (T2<T1) is satisfied, i.e., if it is confirmed that the temperature difference is reduced, the power storage devices 13 and 23 are shifted to a "normal mode" for setting the same SOC target value in both the first and second power storage devices (13 and 23). By causing the power storage devices 13 and 23 to perform what is called a hysteresis operation for providing an appropriate difference (T1>T2) between T2 and T1 in such a manner, it is possible to prevent chattering that could occur when the "temperature difference reduction mode" and the "normal mode" are switched as appropriate.

With the hybrid drive system according to the third embodiment that performs the control explained above, it is possible to further facilitate equalization of the voltages and the like of the first and second power storage devices (13 and 23). As a result, it is possible to more quickly execute equalization of the voltages and the like.

As explained above, with the hybrid drive system in the third embodiment, when the temperature difference between the internal temperature of the first power storage device and the internal temperature of the second power storage device exceeds the threshold, the hybrid drive system controls the power supply device connected to the power storage device on the higher temperature side such that the voltage or the charging amount of the power storage device on the lower temperature side is larger than the voltage or the charging amount of the power storage device on the higher temperature side. Therefore, an effect is obtained where it is possible to further facilitate equalization of the charging amounts or voltages of the first and second power storage devices.

Fourth Embodiment

Figure 9:
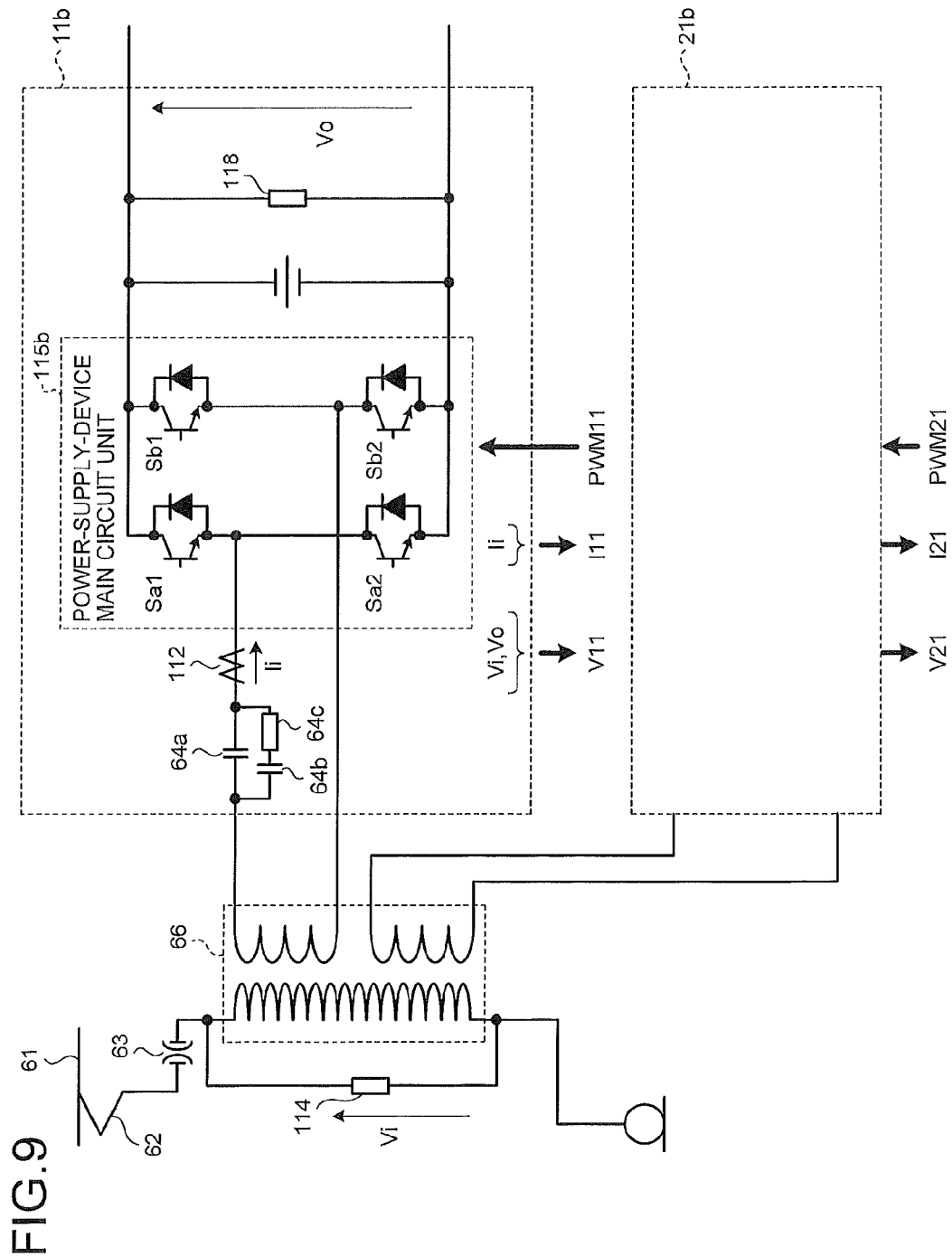
FIG. 9 is a diagram illustrating a configuration example of a hybrid drive system according to a fourth embodiment.

FIG. 9 is a diagram illustrating a configuration example of a hybrid drive system according to a fourth embodiment. The hybrid drive system in the first embodiment receives direct-current power via the direct-current overhead wire 51 as an input. In contrast, the hybrid drive system in the fourth embodiment receives alternating-current power via an alternating-current overhead wire 61 as an input. Specifically, a transformer 66 is provided on the input side of the power supply devices 11b and 21b. The input-voltage measuring unit 114, which measures the voltage (a transformer primary voltage: Vi) applied to the primary side of the transformer 66, is provided. In FIG. 9, components the same as or equivalent to the components in the first embodiment are denoted by the same reference numerals and signs and redundant explanation of these components is omitted.

The alternating-current power from the alternating-current overhead wire 61 is input to the primary winding of the transformer 66 via a pantograph 62 and an overhead wire breaker 63. The transformer 66 includes the same number of sets of secondary windings as the number of drive systems. The transformer 66 steps down the overhead wire voltage to a voltage suitable for power-supply-device main circuit units 115b present in the power supply devices (11b and 21b) in a later stage. The outputs from the secondary windings of the transformer 66 are once input via contactors 64a and 64b and a charging resistor 64c. In FIG. 9, concerning connection of the contactors 64a and 64b and the charging resistor 64c, a form is illustrated in which the contactor 64b is closed only during a charging operation. Consequently, after the charging operation, the contactor 64b can be opened. Therefore, it is possible to suppress energization heat generation in the charging resistor 64c.

The first and second power supply devices (11b and 21b) in the fourth embodiment are devices that convert supplied alternating-current power into direct-current power having a direct-current voltage suitable for the first and second load devices (12 and 22) and the first and second power storage devices (13 and 23). On the basis of the voltage information V11 and V21 (Vi and Vo), which is obtained by the input-voltage measuring unit 114, which measures the primary side voltage of the transformer 66, and the output-voltage measuring units 118 in the power supply devices 11b and 21b, and also on the basis of the current information I11 and I21 (Ii), which is obtained by the input-current measuring units 112 in the power supply devices 11b and 21b, ON/OFF signals for the semiconductor switches (Sa1, Sb1, Sa2, and Sb2) from which the power-supply-device main circuit unit 115b included in each of the power supply devices 11b and 21b is configured are generated in each control unit not illustrated in FIG. 9. By being controlled in this way, an AC-DC converting operation is performed in the power supply devices 11b and 21b.

The load devices 12 and 22 can be propulsion control devices for subjecting a railroad vehicle to propulsion control or can be auxiliary power supply devices for supplying electric power to devices other than the propulsion control devices in the railroad vehicle. When the load devices 12 and 22 are propulsion control devices, the load devices 12 and 22 include power converting devices that convert supplied direct-current power into alternating-current power having a variable frequency and a variable voltage amplitude, alternating-current motors driven by the alternating-current power, and traveling devices that transmit driving forces output from the alternating-current motors to the wheels. When the load devices 12 and 22 are auxiliary power supply devices, the load devices 12 and 22 perform an operation for converting supplied direct-current power into alternating-current power having a fixed frequency and a fixed voltage amplitude and supplying the alternating-current power to devices mounted on the vehicle.

In the fourth embodiment, it is possible to, under a condition where the vehicle travels under the alternating-current overhead wire 61, realize effects the same as the effects in the first to third embodiments, i.e., equalization of the voltages and the like of the first and second power storage devices (13 and 23). Therefore, it is possible to attain equalization of the service lives of the power storage devices.

Fifth Embodiment

Figure 10:
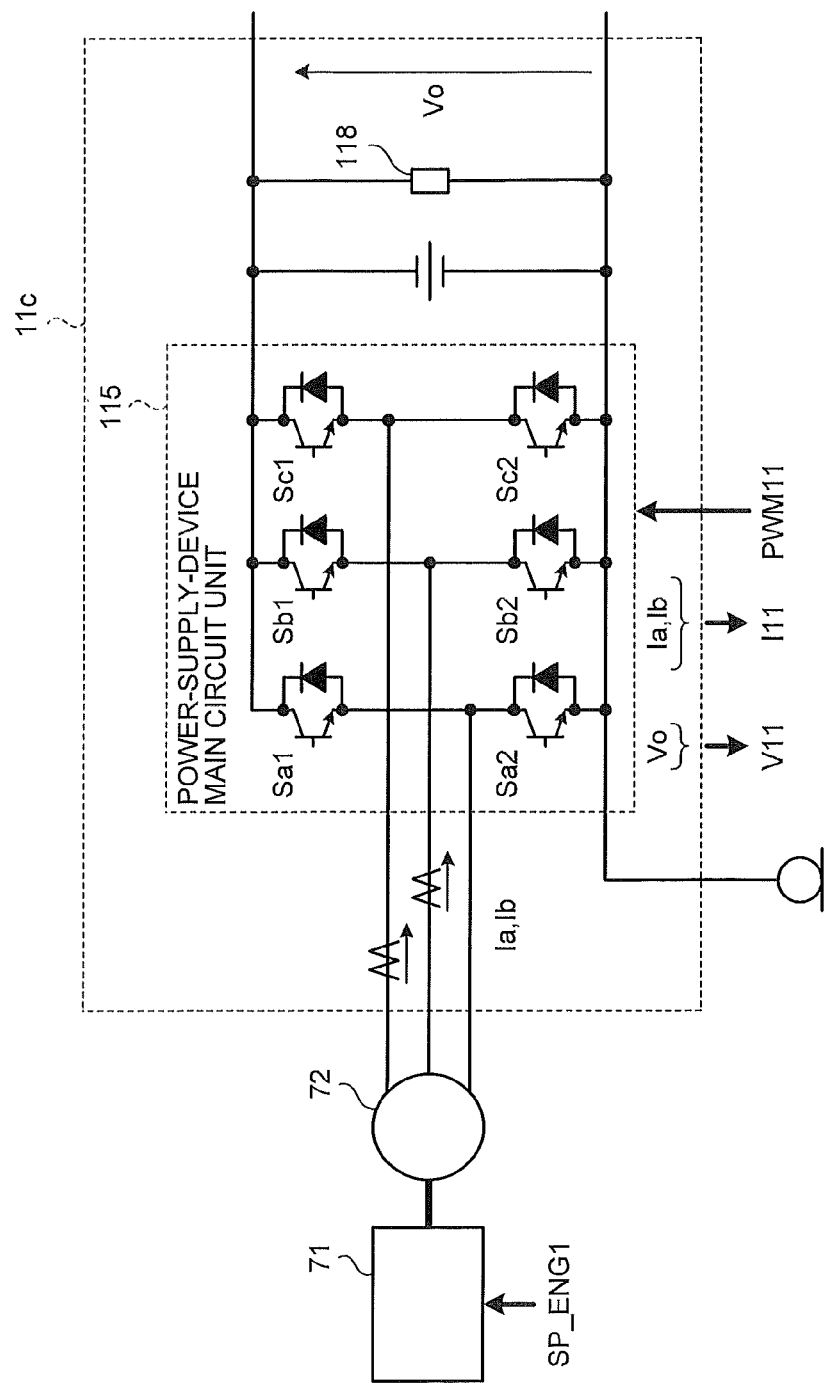
FIG. 10 is a diagram illustrating a configuration example of a hybrid drive system according to a fifth embodiment.

FIG. 10 is a diagram illustrating a configuration example of a hybrid drive system according to a fifth embodiment. In the first to fourth embodiments, the electric power from the overhead wire (the first to third embodiments: the direct-current overhead wire, the fourth embodiment: the alternating-current overhead wire) is received as an input. In contrast, in the fifth embodiment, a power generating device is an internal combustion engine and a generator. In FIG. 10, components the same as or equivalent to the components in the first embodiment are denoted by the same reference numerals and signs and redundant explanation of these components is omitted.

An engine 71 is an internal combustion engine such as a diesel engine. The mechanical output shaft of the engine 71 and the rotating shaft of a generator 72 are directly connected or connected via not-illustrated gears, pulleys, and the like. The generator 72 is an alternating-current generator. For example, three-phase alternating-current power is obtained from the generator 72 and is input to a power supply device 11c. As illustrated in the figure, the engine 71, the generator 72, and the power supply device 11c are components of the hybrid drive system and the number of sets of these components that are disposed and connected is basically the same as the number of sets of groups.

The power supply device 11c is a power converter that converts alternating-current power from the generator 72 into direct-current power input to the first power storage device 13 and the first load device 12. The power supply device 11c operates according to the transfer of a signal as explained below.

When direct-current power needs to be output from the power supply device 11c, first, a speed command or a notch signal SP_ENG1, which is a digital bit signal corresponding to the speed command, is output to the engine 71. The engine 71 starts an operation with a speed characteristic conforming to the command. Then, torque control of the generator 72 is executed on the basis of input current information and output voltage information obtained by the power supply device 11c. According to such control, electric power corresponding to speed×torque is generated in the generator 72 and a direct-current power output is obtained by a main circuit operation of the power supply device 11c.

In the fifth embodiment, under the configuration in which the power generating device is the internal combustion engine and the generator, it is possible to realize effects the same as the effects in the first to third embodiments, i.e., equalization of the voltages and the like of the first and second power storage devices (13 and 23). Therefore, it is possible to attain equalization of the service lives of the power storage devices.

Although not illustrated in the figure, it goes without saying that an input to the power supply device can be from another power supply source such as a fuel cell.

Sixth Embodiment

Figure 11:
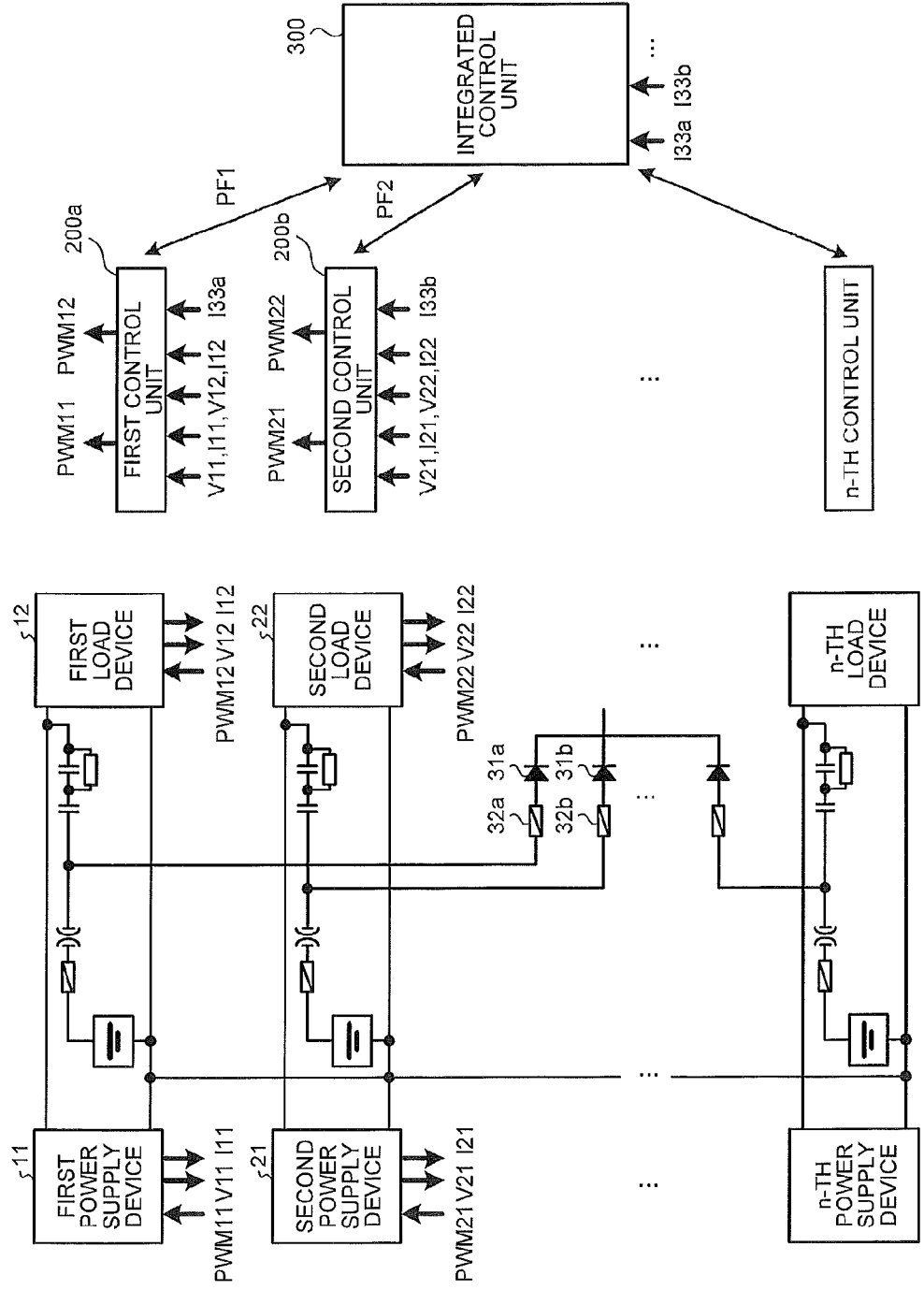
FIG. 11 is a diagram illustrating a configuration example of a hybrid drive system according to a sixth embodiment.

FIG. 11 is a diagram illustrating a configuration example of a hybrid drive system according to a sixth embodiment. In the illustration in the first embodiment, two drive systems are present in the formation. However, in the illustration in the sixth embodiment, three or more drive systems are present in a formation. Specifically, when the number of drive systems is represented as n, n outputs are configured by causing the cathode side terminals of n diodes (31a, 31b, ..., and 31n) to face one another. In FIG. 11, components the same as or equivalent to the components in the first embodiment are denoted by the same reference numerals and signs and redundant explanation of these components is omitted.

When all of the n drive systems are normally functioning, the power-supply-supplement-amount calculating unit 214 provided in each control unit only has to output 1/n (or a component equivalent to 1/n) of the current measurement value I33a to the adder 212 as a power supply supplement amount. Processing after that is the same as the processing in the first embodiment.

When m (m<n) drive systems among then drive systems are normally functioning and the remaining drive systems have failed or are not operating, the power-supply-supplement-amount calculating unit 214 only has to output 1/m (or a component equivalent to 1/m) of the current measurement value I33a to the adder 212 as the power supply supplement amount.

When there is a large number of drive systems, it is useful for simplifying signal processing and a device configuration to provide an integrated control unit 300 that monitors and controls state information on first to n-th control units and share functions as illustrated in FIG. 11. In the case of such a configuration, the current measurement values (I33a, I33b, ...) are collected in the integrated control unit 300 and the failure recognition signals. (PF1, PF2, ...) are output from the integrated control unit 300 to the first to n-th control units. Consequently, it is possible to realize control the same as the control in the first embodiment.

In the sixth embodiment, it is possible to realize effects the same as the effects in the first to third embodiments, i.e., equalization of the voltages and the like of the first to n-th power storage devices (13, 23, ...). Therefore, it is possible to attain equalization of the service lives of the power storage devices.

Note that the configurations illustrated in the above embodiment are examples of the configuration of the present invention and it is obvious that the configurations can be combined with other publicly known technologies and the configurations can be changed, for example, by omitting a part thereof without departing from the scope of the present invention.

INDUSTRIAL APPLICABILITY

As explained above, the present invention is useful as a hybrid drive system that can equalize the service lives of power storage devices.

REFERENCE SIGNS LIST 1 drive system of a first group, 2 drive system of a second group, 3 auxiliary power supply device, 11, 11b first power supply device, 12 first load device, 13 first power storage device, 15 fuse, 16, 26 breaker, 17a, 17b, 27a, 27b, 54a, 54b, 64a, 64b contactor, 17c, 27c, 54c, 64c charging resistor, 21, 21b second power supply device, 22 second load device, 23 second power storage device, 25 fuse, 30 power converting device, 31a, 31b diode, 32a, 32b fuse, 33, 33a, 33b current measuring device, 34a, 34b power line, 36a, 36b temperature detection sensor, 51 direct-current overhead wire, 52 pantograph, 53 overhead wire breaker, 61 alternating-current overhead wire, 62 pantograph, 63 overhead wire breaker, 66 transformer, 71 engine, 72 generator, 111 filter reactor, 112 input-current measuring unit, 113, 122 filter capacitor, 114 input-voltage measuring unit, 115, 115b power-supply-device main circuit unit, 116 output reactor, 117 output-current measuring unit, 118 output-voltage measuring unit, 121 load-input-current measuring unit, 123 load-input-voltage measuring unit, 124 load-device main circuit unit, 125 load-output-current measuring unit, 126a, 126b alternating-current motor, 200a first control unit, 200b second control unit, 210 output-current-command-value generating unit, 212 adder, 214 power-supply-supplement-amount calculating unit, 220 output current controller, 222 subtractor, 224 controller, 250 third control unit, 300 integrated control unit.

The invention claimed is:

1. A hybrid drive system including first and second power supply devices that supply direct-current power, first and second power storage devices that are respectively connected to the first and second power supply devices and accumulate or discharge direct-current power, a first load device that receives direct-current power supplied from the first power supply device and the first power storage device and drives a first load, and a second load device that receives direct-current power supplied from the second power supply device and the second power storage device and drives a second load, the hybrid drive system comprising:
  a first diode that includes an anode side terminal connected to an output side of the first power storage device;
  a second diode that includes an anode side terminal connected to an output side of the second power storage device; and
  an auxiliary power supply device to which a connection terminal where cathode side terminals of the first and second diodes are connected is connected as an input terminal.

2. The hybrid drive system according to claim 1, wherein the auxiliary power supply device is a device that outputs electric power other than electric power for propulsion driving of a vehicle.

3. The hybrid drive system according to claim 1, further comprising a current measuring device to detect an input current input to the auxiliary power supply device, wherein the hybrid drive system calculates first and second power supply supplement amounts, which are a same amount, on a basis of a current value obtained by the current measuring device, and the first and second power supply supplement amounts are given as command values for the first and second power storage devices, respectively.

4. The hybrid drive system according to claim 1, further comprising:

a current measuring device to detect an input current input to the auxiliary power supply device; and a voltage detector to detect an input voltage input to the auxiliary power supply device, wherein the hybrid drive system calculates first and second power supply supplement amounts, which are a same amount, on a basis of a product of a current value obtained by the current measuring device and a voltage value obtained by the voltage detector, and the first and second power supply supplement amounts are given as command values for the first and second power storage devices, respectively.

5. The hybrid drive system according to claim 1, wherein the first power supply device and the first load device are individually controlled by a first control unit, the second power supply device and the second load device are individually controlled by a second control unit, each of the first and second control units includes:

an output-current-command-value generating unit to generate an output current command value using a power supply supplement amount that is calculated on a basis of a current value obtained by a current measuring device that detects an input current input to the auxiliary power supply device; and an output current controller to generate an output voltage command value for causing the current value obtained by the current measuring device to follow the output current command value and output the output voltage command value to a corresponding one of the power supply devices, and a power supply supplement amount calculated by the first control unit and a power supply supplement amount calculated by the second control unit are a same amount.

6. The hybrid drive system according to claim 1, wherein the first power supply device and the first load device are individually controlled by a first control unit, the second power supply device and the second load device are individually controlled by a second control unit, each of the first and second control units includes:

an output-current-command-value generating unit to generate an output current command value using a power supply supplement amount that is calculated on a basis of a product of a current value obtained by a current measuring device that detects an input current input to the auxiliary power supply device and a voltage value obtained by a voltage detector that detects an input voltage input to the auxiliary power supply device; and an output current controller to generate an output voltage command value for causing the current value obtained by the current measuring device to follow the output current command value and output the output voltage command value to a corresponding one of the power supply devices, and a power supply supplement amount calculated by the first control unit and a power supply supplement amount calculated by the second control unit are a same amount.

7. The hybrid drive system according to claim 5, wherein the current measuring device includes a first current measuring device to input a measurement value to the first control unit and a second current measuring device to input a measurement value to the second control unit.

8. The hybrid drive system according to claim 5, wherein the current measuring device includes a first current measuring device to input a measurement value to both the first and second control units and a second current measuring device to input a measurement value to both the first and second control units, and the output-current-command-value generating units of the first and second control units generate an output command value using an average of the measurement values.

9. The hybrid drive system according to claim 5, wherein, when both the first and second power supply devices are continuing a normal operation, the hybrid drive system calculates a component equivalent to a half of a measurement value of the current measuring device as the power supply supplement amount.

10. The hybrid drive system according to claim 5, wherein, when any one of the first and second power supply devices stops operating, an output voltage command value that is calculated on a basis of a power supply supplement amount that is twice as large as a power supply supplement amount when both the first and second power supply devices are normally functioning is given to another of the first and second power supply devices that is continuing a normal operation.

11. The hybrid drive system according to claim 1, further comprising first and second temperature detection sensors to measure internal temperatures of the first and second power storage devices, respectively, wherein when a temperature difference between the internal temperature of the first power storage device and the internal temperature of the second power storage device exceeds a threshold, the hybrid drive system controls a power supply device connected to a power storage device on a higher temperature side such that a voltage or a charging amount of a power storage device on a lower temperature side is larger than a voltage or a charging amount of the power storage device on a higher temperature side.

12. The hybrid drive system according to claim 1, wherein the first and second power supply devices are DC-DC converters to convert a voltage value of direct-current power supplied from a direct-current overhead wire into a direct-current voltage suitable for the power storage devices.

13. The hybrid drive system according to claim 1, wherein the first and second power supply devices are AC-DC converters to convert alternating-current power supplied from an alternating-current overhead wire into direct-current power having a direct-current voltage suitable for the power storage devices.

14. The hybrid drive system according to claim 1, further comprising a generator driven by an internal combustion engine, wherein the first and second power supply devices are AC-DC converters to convert alternating-current power supplied from the generator into direct-current power having a direct-current voltage suitable for the power storage devices.

15. The hybrid drive system according to claim 1, further comprising a fuel cell, wherein the first and second power supply devices are DC-DC converters to convert direct-current power supplied from the fuel cell into direct-current power having a direct-current voltage suitable for the power storage devices.

16. A hybrid drive system comprising:
a plurality of drive systems, each including a power supply device that supplies direct-current power, a power storage device that is connected to the power supply device and accumulates or discharges direct-current power, and a load device that receives direct-current power supplied from the power supply device and the power storage device and drives a load;
a plurality of diodes, cathode side terminals of which are connected together and anode side terminals of which are electrically connected to output ends of a plurality of the power storage devices; and
an auxiliary power supply device to which an output of the power storage devices is supplied through the cathode side terminals that are connected together.

17. The hybrid drive system according to claim 6, wherein the current measuring device includes a first current measuring device to input a measurement value to the first control unit and a second current measuring device to input a measurement value to the second control unit.

18. The hybrid drive system according to claim 6, wherein the current measuring device includes a first current measuring device to input a measurement value to both the first and second control units and a second current measuring device to input a measurement value to both the first and second control units, and
the output-current-command-value generating units of the first and second control units generate an output command value using an average of the measurement values.

19. The hybrid drive system according to claim 6, wherein, when both the first and second power supply devices are continuing a normal operation, the hybrid drive system calculates a component equivalent to a half of a measurement value of the current measuring device as the power supply supplement amount.

20. The hybrid drive system according to claim 6, wherein, when any one of the first and second power supply devices stops operating, an output voltage command value that is calculated on a basis of a power supply supplement amount that is twice as large as a power supply supplement amount when both the first and second power supply devices are normally functioning is given to another of the first and second power supply devices that is continuing a normal operation.

* * * * *